US006785262B1

(12) United States Patent
Yao et al.

(10) Patent No.: US 6,785,262 B1
(45) Date of Patent: Aug. 31, 2004

(54) METHOD AND APPARATUS FOR VOICE LATENCY REDUCTION IN A VOICE-OVER-DATA WIRELESS COMMUNICATION SYSTEM

(75) Inventors: Yu-Dong Yao, San Diego, CA (US); James Tomcik, Carlsbad, CA (US); Matthew B. von Damm, Escondido, CA (US); James M. Brown, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/406,945

(22) Filed: Sep. 28, 1999

(51) Int. Cl.[7] ........................ H04L 12/66; H04L 12/56; H04J 3/06

(52) U.S. Cl. ........................ 370/352; 370/516

(58) Field of Search ........................ 370/229, 230–235, 370/252, 349, 412–417, 493, 516, 352, 356, 395.64, 506

(56) References Cited

U.S. PATENT DOCUMENTS

| | | | | |
|---|---|---|---|---|
| 5,812,200 A | | 9/1998 | Normile | 375/240.12 |
| 5,828,653 A | * | 10/1998 | Goss | 370/230 |
| 6,169,738 B1 | * | 1/2001 | Sriram et al. | 370/395 |
| 6,219,339 B1 | * | 4/2001 | Doshi et al. | 370/235 |
| 6,229,789 B1 | * | 5/2001 | Simpson et al. | 370/235 |
| 6,243,359 B1 | * | 6/2001 | Roy et al. | 370/230 |
| 6,247,058 B1 | * | 6/2001 | Miller et al. | 709/234 |
| 6,282,196 B1 | * | 8/2001 | Lyons et al. | 370/394 |

FOREIGN PATENT DOCUMENTS

| | | |
|---|---|---|
| WO | 9629804 | 9/1996 |
| WO | 9909783 | 2/1999 |

* cited by examiner

*Primary Examiner*—Chau Nguyen
*Assistant Examiner*—Soon-Dong Hyun
(74) *Attorney, Agent, or Firm*—Philip R. Wadsworth; Charles D. Brown; Thomas M. Thibault

(57) ABSTRACT

A method and apparatus for reducing voice latency in a voice-over-data wireless communication system. In a transmitter, data frames are created from audio information by a vocoder and stored in a queue. Prior to storage, some of the data frames are eliminated, or dropped, and are not stored in the queue. In a receiver, data frames are generated from received signals and stored in a queue. Prior to storage in the receiver queue, some of the data frames are dropped. Data frames are dropped either at a single fixed rate, a dual fixed rate, or a variable rate, generally depending on a communication channel latency. By dropping data frames at the transmitter, the receiver, or both, voice latency due to data frame retransmissions is reduced.

7 Claims, 8 Drawing Sheets

METHOD AND APPARATUS FOR VOICE LATENCY REDUCTION IN A VOICE-OVER-DATA WIRELESS COMMUNICATION SYSTEM

BACKGROUND OF THE INVENTION

I. Field of the Invention

The present invention pertains generally to the field of wireless communications, and more specifically to providing an efficient method and apparatus for reducing voice latency associated with a voice-over-data wireless communication system.

II. Background

The field of wireless communications has many applications including cordless telephones, paging, wireless local loops, and satellite communication systems. A particularly important application is cellular telephone systems for mobile subscribers. (As used herein, the term "cellular" systems encompasses both cellular and PCS frequencies.) Various over-the-air interfaces have been developed for such cellular telephone systems including frequency division multiple access (FDMA), time division multiple access (TDMA), and code division multiple access (CDMA). In connection therewith, various domestic and international standards have been established including Advanced Mobile Phone Service (AMPS), Global System for Mobile (GSM), and Interim Standard 95 (IS-95). In particular, IS-95 and its derivatives, such as IS-95A, IS-95B (often referred to collectively as IS-95), ANSI J-STD-008, IS-99, IS-657, IS-707, and others, are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. An exemplary cellular telephone system configured substantially in accordance with the use of the IS-95 standard is described in U.S. Pat. No. 5,103,459 entitled "System and Method for Generating Signal Waveforms in a CDMA Cellular Telephone System", which is assigned to the assignee of the present invention and incorporated herein by reference. The aforesaid patent illustrates transmit, or forward-link, signal processing in a CDMA base station. Exemplary receive, or reverse-link, signal processing in a CDMA base station is described in U.S. application Ser. No. 08/987,172, filed Dec. 9, 1997, entitled MULTI-CHANNEL DEMODULATOR, which is assigned to the assignee of the present invention and incorporated herein by reference. In CDMA systems, over-the-air power control is a vital issue. An exemplary method of power control in a CDMA system is described in U.S. Pat. No. 5,056,109 entitled "Method and Apparatus for Controlling Transmission Power in A CDMA Cellular Mobile Telephone System" which is assigned to the assignee of the present invention and incorporated herein by reference.

A primary benefit of using a CDMA over-the-air interface is that communications are conducted simultaneously over the same RF band. For example, each mobile subscriber unit (typically a cellular telephone) in a given cellular telephone system can communicate with the same base station by transmitting a reverse-link signal over the same 1.25 MHz of RF spectrum. Similarly, each base station in such a system can communicate with mobile units by transmitting a forward-link signal over another 1.25 MHz of RF spectrum.

Transmitting signals over the same RF spectrum provides various benefits including an increase in the frequency reuse of a cellular telephone system and the ability to conduct soft handoff between two or more base stations. Increased frequency reuse allows a greater number of calls to be conducted over a given amount of spectrum. Soft handoff is a robust method of transitioning a mobile unit between the coverage area of two or more base stations that involves simultaneously interfacing with two or more base stations. (In contrast, hard handoff involves terminating the interface with a first base station before establishing the interface with a second base station.) An exemplary method of performing soft handoff is described in U.S. Pat. No. 5,267,261 entitled "Mobile Station Assisted Soft Handoff in a CDMA Cellular Communications System" which is assigned to the assignee of the present invention and incorporated herein by reference.

Under Interim Standards IS-99 and IS-657 (referred to hereinafter collectively as IS-707), an IS-95-compliant communications system can provide both voice and data communications services. Data communications services allow digital data to be exchanged between a transmitter and one or more receivers over a wireless interface. Examples of the type of digital data typically transmitted using the IS-707 standard include computer files and electronic mail.

In accordance with both the IS-95 and IS-707 standards, the data exchanged between a transmitter and a receiver is processed in discreet packets, otherwise known as data packets or data frames, or simply frames. To increase the likelihood that a frame will be successfully transmitted during a data transmission, IS-707 employs a radio link protocol (RLP) to track the frames transmitted successfully and to perform frame retransmission when a frame is not transmitted successfully. Re-transmission is performed up to three times in IS-707, and it is the responsibility of higher layer protocols to take additional steps to ensure that frames are successfully received.

Recently, a need has arisen for transmitting audio information, such as voice, using the data protocols of IS-707. For example, in a wireless communications system employing cryptographic techniques, audio information may be more easily manipulated and distributed among data networks using a data protocol. In such applications, it is desirable to maintain the use of existing data protocols so that no changes to existing infrastructure are necessary. However, problems occur when transmitting voice using a data protocol, due to the nature of voice characteristics.

One of the primary problems of transmitting audio information using a data protocol is the delays associated with frame re-transmissions using an over-the-air data protocol such as RLP. Delays of more than a few hundred milliseconds in speech can result in unacceptable voice quality. When transmitting data, such as computer files, time delays are easily tolerated due to the non real-time nature of data. As a consequence, the protocols of IS-707 can afford to use the frame re-transmission scheme as described above, which may result in transmission delays, or a latency period, of more than a few seconds. Such a latency period is unacceptable for transmitting voice information.

What is needed is a method and apparatus for minimizing the problems caused by the time delays associated with frame retransmission requests from a receiver. Furthermore, the method and apparatus should be backwards-compatible with existing infrastructure to avoid expensive upgrades to those systems.

SUMMARY OF THE INVENTION

The present invention is a method and apparatus for reducing voice latency, otherwise known as communication channel latency, associated with a voice-over-data wireless communication system. Generally, this is achieved by dropping data frames at a transmitter, a receiver, or both, without degrading perceptible voice quality.

In a first embodiment of the present invention, in a voice-over-data communication system, data frames are dropped in a transmitter at a fixed, predetermined rate prior to storage in a queue. Audio information, such as voice, is transformed into data frames by a voice-encoder, or vocoder, at a fixed rate, in the exemplary embodiment every 20 milliseconds. The data frames are stored in a queue for use by further processing elements. A processor located within the transmitter prevents data frames from being stored in the queue at a fixed, predetermined rate. This is known as frame dropping. As a result of fewer data frames being stored in the queue, fewer data frames representing the audio information are transmitted to the receiver, thereby alleviating the problem of communication channel latency between transmitter and receiver due to poor communication channel quality.

At the receiver, data frames are received, demodulated, and placed into a queue for use by a voice decoder. Data frames are withdrawn from the queue by the voice decoder at the same fixed rate as they were generated at the transmitter, i.e., every 20 milliseconds in the exemplary embodiment. Occasionally, the size of the queue will vary dramatically due to poor communication channel quality. Under such circumstances, frame retransmissions from the transmitter to the receiver occur, causing an overall increase in the number of data frames ultimately used by the voice decoder. The increased size of the queue causes subsequent frames added to the queue to be delayed from reaching the voice decoder, resulting in increased communication channel latency. The present invention reduces this latency by transmitting fewer data frames to represent the audio information. Thus, during periods of poor communication channel quality, the size of the receive queue is held to a reasonable size, preventing an unreasonable amount of communication channel latency.

In a second embodiment of the present invention, data frames are dropped at a transmitter at either one of two rates, depending on the communication channel latency which relates to the quality of the communication channel. A first rate is used if the communication channel latency is within reasonable limits, i.e., little or no perceptible voice latency. A second, higher rate is used when it is determined that the communication channel latency is sufficiently noticeable. In this embodiment, as in the first embodiment, audio information is transformed into data frames by a voice-encoder, or vocoder, at a fixed rate, in the exemplary embodiment every 20 milliseconds. Under normal channel conditions, where the communication channel latency is within an acceptable range, data frames are dropped at a first, fixed rate. Data frames are dropped at a second, higher rate if a processor determines that the communication channel latency has increased significantly. This embodiment reduces the communication channel latency quickly during bursty channel error conditions where latency can increase rapidly.

In a third embodiment of the present invention, communication channel latency is reduced by dropping data frames at the transmitter at a variable rate, depending on the communication channel latency. In this embodiment, a processor located within the transmitter determines the communication channel latency using one of several possible techniques. If the processor determines that the communication channel latency has changed, frames are dropped at a rate proportional to the level of communication channel latency. As latency increases, the frame dropping rate increases. As latency decreases, the frame dropping rate decreases. As in the first two embodiments, communication channel latency increases when the communication channel quality decreases. This is due primarily to increased frame re-transmissions which occur as the communication channel quality decreases.

In a fourth embodiment, data frames are dropped in accordance with the rate at which the data frames were encoded by a voice-encoder. In this embodiment, a variable-rate vocoder is used to encode audio information into data frames at varying data rates, in the exemplary embodiment, four rates: full rate, half rate, quarter rate, and eighth rate. A processor located within the transmitter determines the communication channel latency using one of several possible techniques. If the processor determines that the communication channel latency has increased beyond a predetermined threshold, eighth-rate frames are dropped as they are produced by the vocoder. If the processor determines that the communication channel latency has increased beyond a second predetermined threshold, both eighth rate and quarter-rate frames are dropped at they are produced by the vocoder. Similarly, half rate and full rate frames are dropped as the communication channel latency continues to increase.

In a fifth embodiment of the present invention, data frames are dropped at the receiver either alone, or in combination with frame dropping at a transmitter. The fifth embodiment can be implemented using any of the above embodiments. For example, data frames can be dropped using a single, fixed rate, two fixed rates, or a variable rate, and can further incorporate the fourth embodiment, where frames are dropped in accordance with their rate at which the data frames have been encoded by the vocoder residing at the transmitter.

In a sixth embodiment, frame dropping is performed at the receiver. Receiver frame dropping is usually performed based on a queue length compared to a queue threshold. In the sixth embodiment, the queue threshold dynamically adjusted to maintain a constant level of voice quality.

DETAILED DESCRIPTION OF THE PREFERRED EMBODIMENTS

The embodiments described herein are described with respect to a wireless communication system operating in accordance with the use of CDMA signal processing techniques of the IS-95, IS-707, and IS-99 Interim Standards. While the present invention is especially suited for use within such a communications system, it should be understood that the present invention may be employed in various other types of communications systems that transmit information in discreet packets, otherwise known as data packets, data frames, or simply frames, including both wireless and wireline communication systems, and satellite-based communication systems. Additionally, throughout the description, various well-known systems are set forth in block form. This is done for the purpose of clarity.

Various wireless communication systems in use today employ fixed base stations that communicate with mobile units using an over-the-air interface. Such wireless communication systems include AMPS (analog), IS-54 (North American TDMA), GSM (Global System for Mobile communications TDMA), and IS-95 (CDMA). In a preferred embodiment, the present invention is implemented in a CDMA system.

Figure 1:
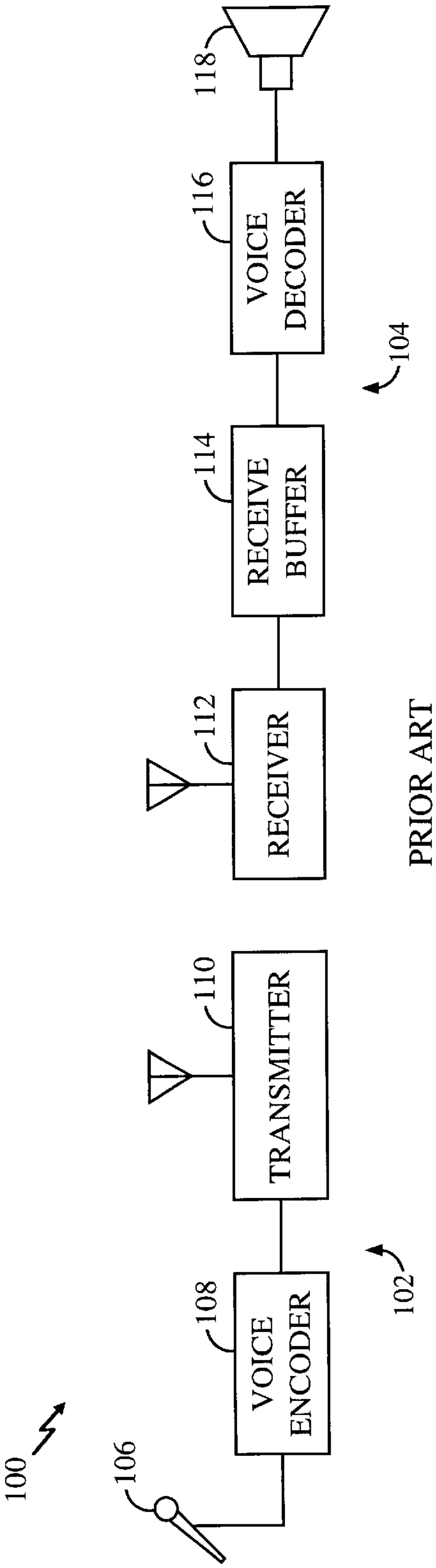
PRIOR ART FIG. 1
FIG. 1 illustrates a prior art wireless communication system having a transmitter and a receiver.

A prior art wireless communication system is shown in FIG. 1, having a transmitter 102 and a receiver 104. Audio information, such as voice, is converted from acoustic energy into electrical energy by transducer 106, typically a microphone. The electrical energy is provided to a voice encoder 108, otherwise known as a vocoder, which generally reduces the bandwidth necessary to transmit the audio information. Typically, voice encoder 108 generates data frames at a constant, fixed rate, representing the original audio information. Each data frame is generally fixed in length, measured in microseconds. The data frames are provided to a transmitter 110, where they are modulated and upconverted for wireless transmission to receiver 104.

Transmissions from transmitter 102 are received by receiver 112, where they are downconverted and demodulated into data frames representing the original data frames generated by voice encoder 108. The data frames are then provided to receiver buffer 114, where they are stored until used by voice decoder 116, for reconstructing the original electrical signal. Once the data frames have been converted into the original electrical signal, the audio information is reproduced using transducer 118, typically an audio speaker.

The purpose of receive buffer 114 is to ensure that at least one data frame is available for use by voice decoder 116 at all times. Data frames are stored on a first in/first out basis. In theory, as one data frame is used by voice decoder 116, a new data frame is provided by receiver 112 and stored in receive buffer 114, thereby keeping the number of frames stored in receive buffer 114 constant. Voice decoder 116 requires a constant, uninterrupted stream of data frames in order to reproduce the audio information correctly. Without receive buffer 114, any interruption in data transmission would result a discontinuation of data frames to voice decoder 116, thereby distorting the reconstructed audio information. By maintaining a constant number of data frames in receive buffer 114, a continuous flow of data frames can still be provided to voice decoder 116, even if a brief transmission interruption occurs.

Figure 2:
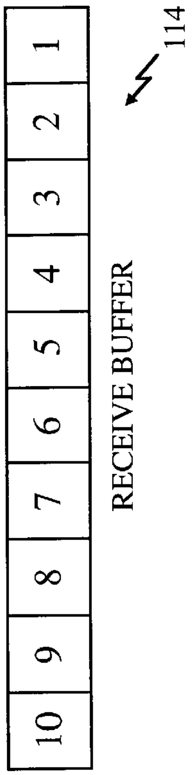
PRIOR ART FIG. 2
FIG. 2 illustrates a prior art receiver buffer used in the receiver of FIG. 1.

One potential problem with the use of receiver buffer 114 is that it may cause a delay, or latency, during the transmission of audio information between transmitter 102 and receiver 104, for example, in a telephonic conversation. FIG. 2 illustrates this problem, showing receive buffer 114. As shown in FIG. 2, receive buffer 114 comprises ten storage slots, each slot able to store one data frame. During a telephonic conversation, received data frames are stored on a first in/first out basis. Assume that slots one through five contain data frames from a conversation in progress. As the conversation continues, data frames are generated by receiver 112 and stored in receive buffer 114 in slot 6, for example, at the same rate as data frames are being removed from slot 1 by voice decoder 116. Thus, each new data frame stored in receive buffer 114 is delayed from reaching slot 1 by the number of previously stored frames ahead of it in receive buffer 114. In the example of FIG. 2, a new data frame placed into receive buffer 114 at position 6 is delayed by 5 frames times multiplied by the rate at which data frames are used by voice decoder 116. For example, if voice decoder 116 removes data frames from receive buffer 114 at a rate of one frame every 20 milliseconds, new data frames stored in slot 6 will be delayed 5 times 20 milliseconds, or 100 milliseconds, before being used by voice decoder 116. Thus a delay, or latency of 100 milliseconds is introduced into the conversation. This latency contributes to the overall latency between transmitter 102 and receiver 104, referred to herein as communication channel latency.

The above scenario assumes that the number of data frames stored in receive buffer 114 remain constant over time. However, in practice, the number of data frames stored within receive buffer 114 at any given time varies, depending on a number of factors. One factor which is particularly influential on the size of receive buffer 114 is the communication channel quality between transmitter 102 and receiver 104. If the communication channel is degraded for some reason, the rate at which data frames are added to receive buffer 114 will be initially slower and then ultimately greater than the rate at which data frames are removed from receive buffer 114 by voice decoder 116. This causes an increase the size of receive buffer 114 so that new data frames are added in later slot positions, for example, in slot position 9. New data frames added at slot position 9 will be delayed 8 frames times 20 milliseconds per frame, or 160 milliseconds, before being used by voice decoder 116. Thus, the communication channel latency increases to 160 milliseconds, which results in noticeable delays in communication between transmitter 102 and receiver 104.

Latency of over a few hundred milliseconds is generally not tolerable during voice communications. Therefore, a solution is needed to reduce the latency associated with degraded channel conditions.

Figure 3:
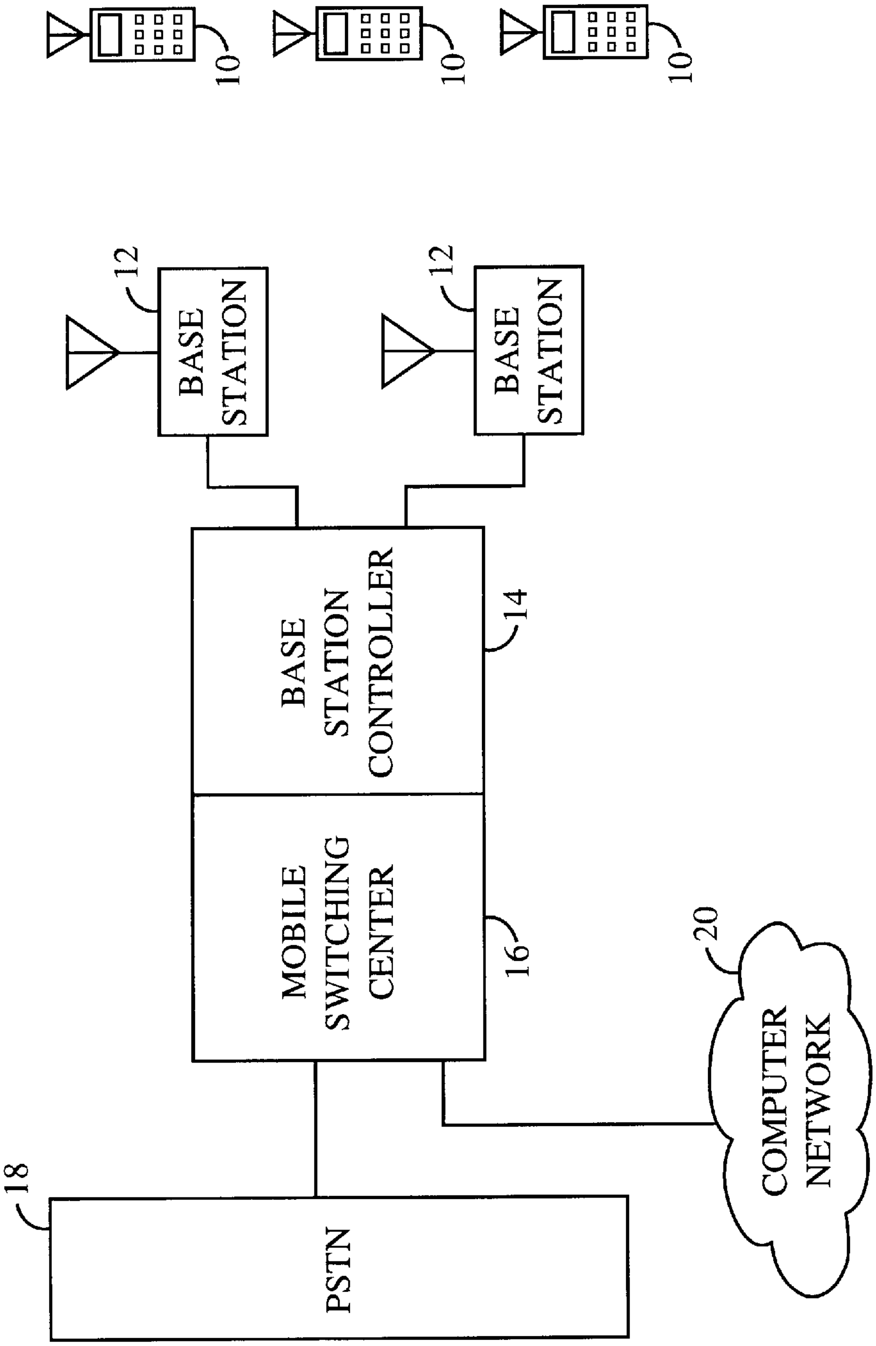
FIG. 3 illustrates a wireless communication system in which the present invention is used.

The present invention overcomes the latency problem generally by dropping data frames at transmitter 102, at receiver 104, or at both locations. FIG. 3 illustrates a wireless communication system in which the present invention is used. The wireless communication system generally includes a plurality of wireless communication devices 10, a plurality of base stations 12, a base station controller (BSC) 14, and a mobile switching center (MSC) 16. Wireless communication device 10 is typically a wireless telephone, although wireless communication device 10 could alternatively comprise a computer equipped with a wireless modem, or any other device capable of transmitting and receiving audio or numerical information to another communication device. Base station 12, while shown in FIG. 1 as a fixed base station, might alternatively comprise a mobile communication device, a satellite, or any other device capable of transmitting and receiving communications from wireless communication device 10.

MSC 16 is configured to interface with a conventional public switch telephone network (PSTN) 18 or directly to a computer network, such as Internet 20. MSC 16 is also configured to interface with BSC 14. BSC 14 is coupled to each base station 12 via backhaul lines. The backhaul lines may be configured in accordance with any of several known interfaces including E1/T1, ATM, or IP. It is to be understood that there can be more than one BSC 14 in the system. Each base station 12 advantageously includes at least one sector (not shown), each sector comprising an antenna pointed in a particular direction radially away from base station 12. Alternatively, each sector may comprise two antennas for diversity reception. Each base station 12 may advantageously be designed to support a plurality of frequency assignments (each frequency assignment comprising 1.25 MHz of spectrum). The intersection of a sector and a frequency assignment may be referred to as a CDMA channel. Base station 12 may also be known as base station transceiver subsystem (BTS) 12. Alternatively, "base station" may be used in the industry to refer collectively to BSC 14 and one or more BTSs 12, which BTSs 12 may also be denoted "cell sites" 12. (Alternatively, individual sectors of a given BTS 12 may be referred to as cell sites.) Mobile subscriber units 10 are typically wireless telephones 10, and the wireless communication system is advantageously a CDMA system configured for use in accordance with the IS-95 standard.

During typical operation of the cellular telephone system, base stations 12 receive sets of reverse-link signals from sets of mobile units 10. The mobile units 10 transmit and receive voice and/or data communications. Each reverselink signal received by a given base station 12 is processed within that base station 12. The resulting data is forwarded to BSC 14. BSC 14 provides call resource allocation and mobility management functionality including the orchestration of soft handoffs between base stations 12. BSC 14 also routes the received data to MSC 16, which provides additional routing services for interface with PSTN 18. Similarly, PSTN 18 and internet 20 interface with MSC 16, and MSC 16 interfaces with BSC 14, which in turn controls the base stations 12 to transmit sets of forward-link signals to sets of mobile units 10.

In accordance with the teachings of IS-95, the wireless communication system of FIG. 3 is generally designed to permit voice communications between mobile units 10 and wireline communication devices through PSTN 18. However, various standards have been implemented, including, for example, IS-707, which permit the transmission of data between mobile subscriber units 10 and data communication devices through either PSTN 18 or Internet 20. Examples of applications which require the transmission of data instead of voice include email applications or text paging. IS-707 specifies how data is to be transmitted between a transmitter and a receiver operating in a CDMA communication system.

The protocols contained within IS-707 to transmit data are different than the protocols used to transmit audio information, as specified in IS-95, due to the properties associated with each data type. For example, the permissible error rate while transmitting audio information can be relatively high, due to the limitations of the human ear. A typical permissible frame error rate in an IS-95 compliant CDMA communication system is one percent, meaning that one percent of transmitted frames can be received in error without a perceptible loss in audio quality.

In a data communication system, the error rate must be much lower than in a voice communication system, because a single data bit received in error can have a significant effect on the information being transmitted. A typical error rate in such a data communication system, specified as a Bit Error Rate (BER) is on the order of $10^{-9}$, or one bit received in error for every billion bits received.

In an IS-707 compliant data communication system, information is transmitted in 20 millisecond data packets in accordance with a Radio Link Protocol, defined by IS-707. The data packets are sometimes referred to as RLP frames. If an RLP frame is received in error by receiver 104, i.e., the received RLP frame contains errors or was never received by receiver 104, a re-transmission request is sent by receiver 104 requesting that the bad frame be re-transmitted. In a CDMA compliant system, the re-transmission request is known as a negative-acknowledgement message, or NAK. The NAK informs transmitter 102 which frame or frames to re-transmit corresponding to the bad frame(s). When the transmitter receives the NAK, a duplicate copy of the data frame is retrieved from a memory buffer and is then re-transmitted to the receiver. This process may be repeated several times if necessary.

The re-transmission scheme just described introduces a time delay, or latency, in correctly receiving a frame which has initially been received in error. Usually, this time delay does not have an adverse effect when transmitting data. However, when transmitting audio information using the protocols of a data communication system, the latency associated with re-transmission requests may become unacceptable, as it introduces a noticeable loss of audio quality to the receiver.

Figure 4:
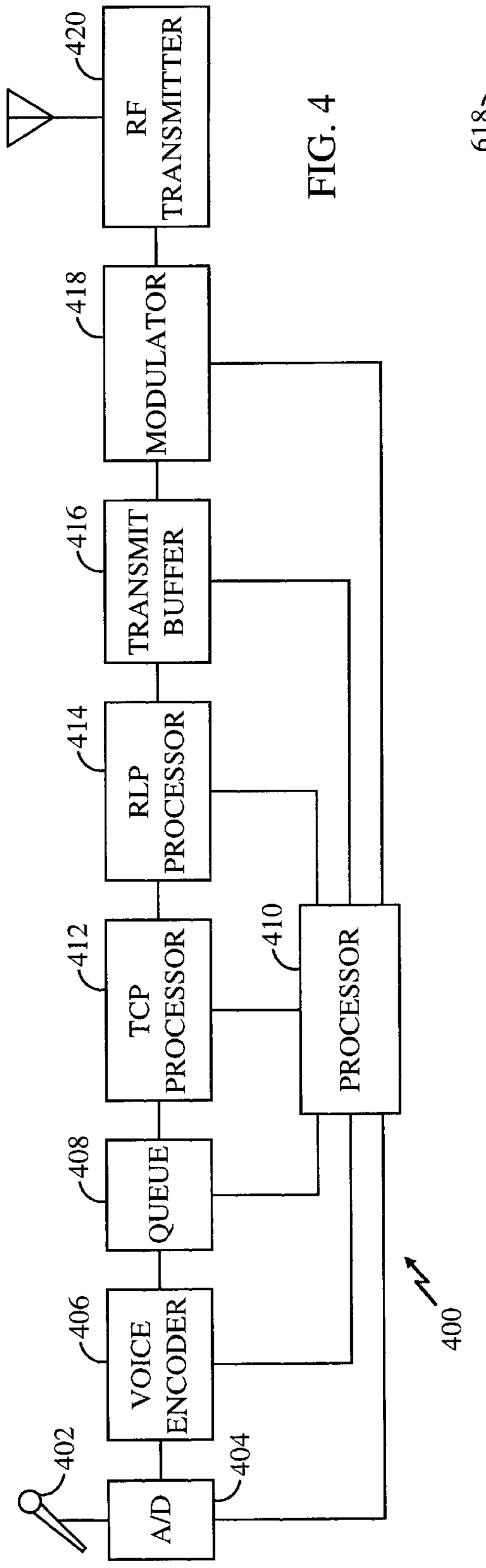
FIG. 4 illustrates a transmitter used in the wireless communication system of FIG. 3 in block diagram format, configured in accordance with an exemplary embodiment of the present invention.

FIG. 4 illustrates a transmitter 400 in block diagram format, configured in accordance with an exemplary embodiment of the present invention. Such a transmitter 400 may be located in a base station 12 or in a mobile unit 10. It should be understood that FIG. 4 is a simplified block diagram of a complete transmitter and that other functional blocks have been omitted for clarity. In addition, transmitter 400 as shown in FIG. 4 is not intended to be limited to any one particular type of transmission modulation, protocol, or standard.

Referring back to FIG. 4, audio information, typically referred to as voice data, is converted into an analog electrical signal by transducer 402, typically a microphone. The analog electrical signal produced by transducer 402 is provided to analog-to-digital converter A/D 404. A/D 404 uses well-known techniques to transform the analog electrical signal from microphone 402 into a digitized voice signal. A/D 404 may perform low-pass filtering, sampling, quantizing, and binary encoding on the analog electrical signal from microphone 402 to produce the digitized voice signal.

The digitized voice signal is then provided to voice encoder 406, which is typically used in conjunction with a voice decoder (not shown). The combined device is typically referred to as a vocoder. Voice encoder 406 is a well-known device for compressing the digitized voice signal to minimize the bandwidth required for transmission. Voice encoder 406 generates consecutive data frames, otherwise referred to as vocoder frames, generally at regular time intervals, such as every 20 milliseconds in the exemplary embodiment, although other time intervals could be used in the alternative. The length of each data frame generated by voice encoder 406 is therefore 20 milliseconds.

One way that many vocoders maximize signal compression is by detecting periods of silence in a voice signal. For example, pauses in human speech between sentences, words, and even syllables present an opportunity for many vocoders to compress the bandwidth of the voice signal by producing a data frame having little or no information contained therein. Such a data frame is typically known as a low rate frame.

Vocoders may be further enhanced by offering variable data rates within the data frames that they produce. An example of such a variable rate vocoder is found in U.S. Pat. No. 5,414,796 (the '796 patent) entitled "VARIABLE RATE VOCODER", assigned to the assignee of the present invention and incorporated by reference herein. When little or no information is available for transmission, variable rate vocoders produce data frames at reduced data rates, thus increasing the transmission capacity of the wireless communication system. In the variable rate vocoder described by the '796 patent, data frames comprise data at either full, one half, one quarter, or one eighth the data rate of the highest data rate used in the communication system.

Data frames generated by voice encoder 406, again, referred to as vocoder frames, are stored in a queue 408, or sequential memory, to be later digitally modulated and then upconverted for wireless transmission. In the present invention, vocoder frames are encoded into data packets, in conformity with one or more well-known wireless data protocols. In a voice-over-data communication system, vocoder frames are converted to data frames for easy transmission among computer networks such as the Internet and to allow voice information to be easily manipulated for such applications as voice encryption using, for example, public-key encryption techniques.

In prior art transmitters, each vocoder frame generated by voice encoder 406 is stored sequentially in queue 408. However, in the present invention, not all vocoder frames are stored. Processor 410 selectively eliminates, or "drops," some vocoder frames in order to reduce the total number of frames transmitted to a receiver. The methods in which processor 410 drops frames is discussed later herein.

Frames stored in queue 408 are provided to TCP processor 412, where they are transformed into data packets suitable for the particular type of data protocol used in a computer network such as the Internet. For example, in the exemplary embodiment, the frames from queue 408 are formatted into TCP/IP frames. TCP/IP is a pair of well-known data protocols used to transmit data over large public computer networks, such as the Internet. Other well-known data protocols may be used in the alternative. TCP processor 412 may be a hardware device, either discreet or integrated, or it may comprise a microprocessor running a software program specifically designed to transform vocoder frames into data packets suitable for the particular data protocol at hand.

Figure 5:
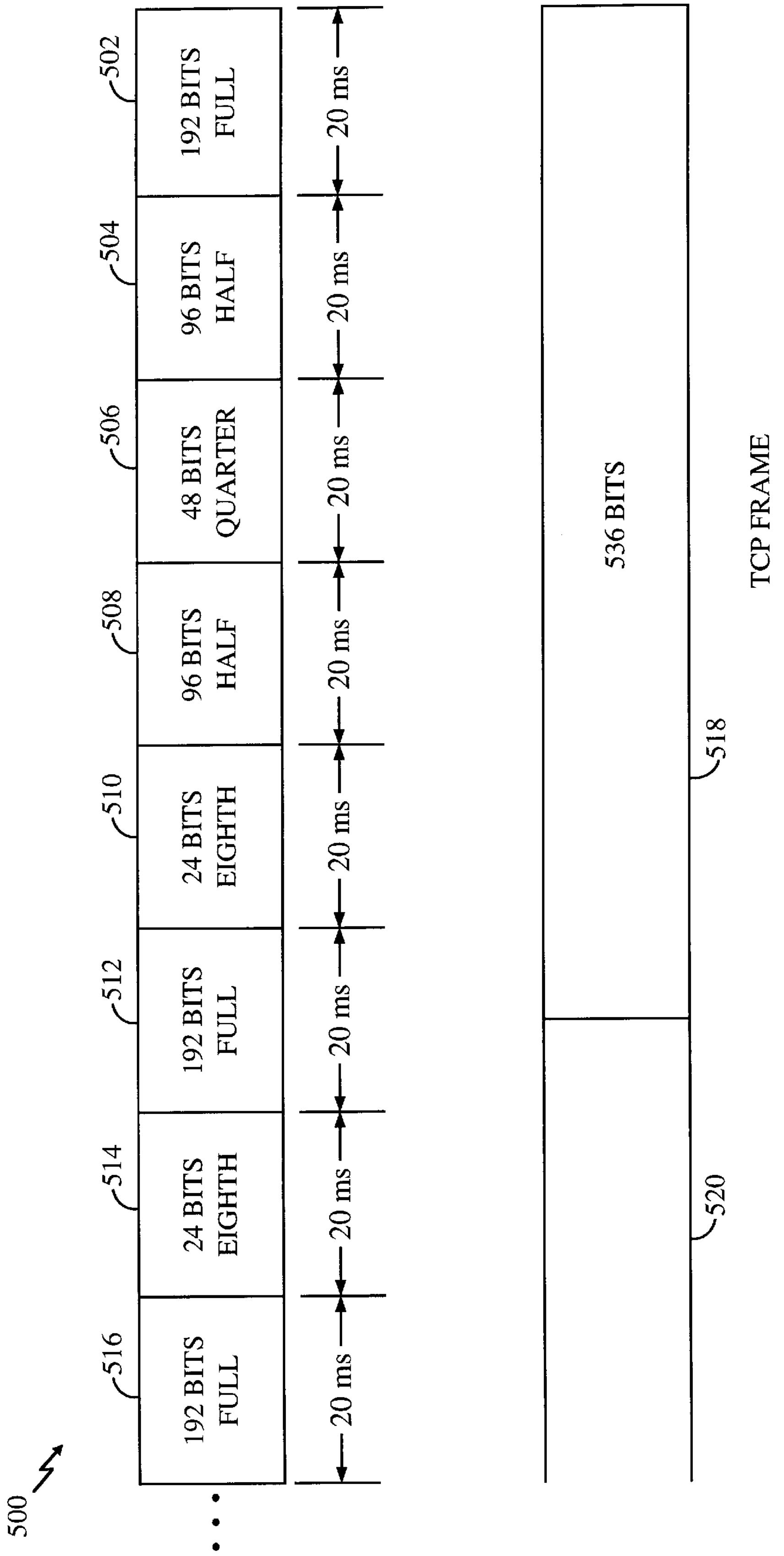
FIG. 5 illustrates a series of data frames and a TCP frame as used by the transmitter of FIG. 4.

FIG. 5 illustrates how variable-rate vocoder frames are converted into TCP frames by TCP processor 412. Data stream 500 represents the contents of queue 408, shown as a series of sequential vocoder frames, each vocoder frame having a frame length of 20 milliseconds. It should be understood that other vocoders could generate vocoder frames having frame lengths of a greater or smaller duration.

As shown in FIG. 5, each vocoder frame contains a number of information bits depending on the data rate for the particular frame. In the present example of FIG. 5, vocoder frames contain data bits equal to 192 for a full rate frame, 96 bits for a half rate frame, 48 bits for a quarter rate frame, and 24 bits for an eighth rate frame. As explained above, frames having high data rates represent periods of voice activity, while frame having lower data rates are representative of periods of less voice activity or silence.

TCP frames are characterized by having a duration measured by the number of bits contained within each frame. As shown in FIG. 5, a typical TCP frame length can be 536 bits, although other TCP frames may have a greater or smaller number of bits. TCP processor 412 fills the TCP frame sequentially with bits contained in each vocoder frame from queue 408. For example, in FIG. 5, the 192 bits contained within vocoder frame 502 are first placed within TCP frame 518, then the 96 bits from vocoder frame 504, and so on until 536 bits have been placed within TCP frame 518. Note that vocoder frame 512 is split between TCP frame 518 and TCP frame 520 as needed to fill TCP frame 518 with 536 bits.

It should be understood that TCP frames are not generated by TCP processor 412 at regular intervals, due to the nature of the variable rate vocoder frames. For example, if no information is available for transmission, for instance no voice information is provided to microphone 402, a long series of low-rate vocoder frames will be produced by voice encoder 406. Therefore, many frames of low-rate vocoder frames will be needed to fill the 536 bits needed for a TCP frame, and, thus, a TCP frame will be produced more slowly. Conversely, if high voice activity is present at microphone 402, a series of high-rate vocoder frames will be produced by voice encoder 406. Therefore, relatively few vocoder frames will be needed to fill the 536 bits necessary for a TCP frame, thus, a TCP frame will be generated more quickly.

The data frames generated by TCP processor 412, referred to as TCP frames in this example, are provided to RLP processor 414. RLP processor 414 receives the TCP frames from TCP processor 412 and re-formats them in accordance with a predetermined over-the-air data transmission protocol. For example, in a CDMA communication system based upon Interim Standard IS-95, data packets are transmitted using the well-known Radio Link Protocol (RLP) as described in Interim Standard IS-707. RLP specifies data to be transmitted in 20 millisecond frames, herein referred to as RLP frames. In accordance with IS-707, RLP frames comprise an RLP frame sequence field, an RLP frame type field, a data length field, a data field for storing information from TCP frames provided by TCP processor 412, and a field for placing a variable number of padding bits.

RLP processor 414 receives TCP frames from TCP processor 412 and typically stores the TCP frames in a buffer (not shown). RLP frames are then generated from the TCP frames using techniques well-known in the art. As RLP frames are produced by RLP processor 414, they are placed into transmit buffer 416. Transmit buffer 416 is a storage device for storing RLP frames prior to transmission, generally on a first-in, first-out basis. Transmit buffer 416 provides a steady source of RLP frames to be transmitted, even though a constant rate of RLP frames is generally not supplied by RLP processor 414. Transmit buffer 416 is a memory device capable of storing multiple data packets, typically 100 data packets or more. Such memory devices are commonly found in the art.

Data frames are removed from transmit buffer 416 at predetermined time intervals equal to 20 milliseconds in the exemplary embodiment. The data frames are then provided to modulator 418, which modulates the data frames in accordance with the chosen modulation technique of the communication system, for example, AMPS, TDMA, CDMA, or others. In the exemplary embodiment, modulator 418 operates in accordance with the teachings of IS-95. After the data frames have been modulated, they are provided to RF transmitter 420 where they are upconverted and transmitted, using techniques well-known in the art.

In a first embodiment of the present invention, data frames are dropped by processor 410 at a predetermined, fixed rate.

In the exemplary embodiment, the rate is 1 frame dropped per hundred frames generated by voice encoder 406, or a rate of 1%. Processor 410 counts the number of frames generated by voice encoder 406. As each frame is generated, it is stored in queue 408. When the $100^{th}$ frame is generated, processor 410 drops the frame by failing to store it in queue 408. The next frame generated by voice encoder 406, the $101^{st}$ frame, is stored in queue 408 adjacent to the $99^{th}$ frame. Alternatively, other predetermined, fixed rates could be used, however, tests have shown that dropping more than 10 percent of frames leads to poor voice quality at a receiver.

In the first embodiment, frames are dropped on a continuous basis, without regard to how much or how little communication channel latency exists between the transmitter and a receiver. However, in a modification to the first embodiment, processor 410 monitors the communication channel latency and implements the fixed rate frame dropping technique only if the communication channel latency exceeds a predetermined threshold. The communication channel latency is generally determined by monitoring the communication channel quality. The communication channel quality is determined by methods well known in the art, and described below. If the communication channel latency drops below the predetermined threshold, processor 410 discontinues the frame dropping process.

In a second embodiment of the present invention, frames are dropped at either one of two fixed rates, depending on the communication channel latency. A first rate is used to drop frames when the communication channel latency is less than a predetermined threshold. A second fixed rate is used to drop frames when the communication channel latency exceeds the predetermined threshold. Again, the communication channel latency is generally derived from the communication channel quality, which in turn depends on the channel error rate. Further details of determining the communication channel latency is described below.

Often, the communication channel quality, thus the communication channel latency, is expressed in terms of a channel error rate, or the number of frames received in error by the receiver divided by the total number of frames transmitted over a given time period. A typical predetermined threshold in the second embodiment, then, could be equal to 7%, meaning that if more than 7 percent of the transmitted frames are received in error, generally due to a degraded channel condition, frames are dropped at the second rate. The second rate is generally greater than the first rate. If the channel quality is good, the error rate will generally be less than the predetermined rate, therefore frames are dropped using the first rate, typically equal to between one and four percent.

Referring back to FIG. 4, two fixed, predetermined rates are used to drop frames from voice encoder 406, a first rate less than a second rate. For example, the first rate could be equal to one percent, and the second rate could be equal to eight percent. The predetermined threshold is set to a level which indicates a degraded channel quality, expressed in terms of the percentage of frames received in error by the receiver. In the present example, an error rate of 7 percent is chosen as the predetermined threshold. Processor 410 is capable of determining the channel quality in one of several methods well known in the art. For example, processor 410 can count the number of NAKs received. A higher number of NAKs indicates a poor channel quality, as more frame re-transmissions are necessary to overcome the poor channel condition. The power level of transmitted frames is another indication that processor 410 can use to determine the channel quality. Alternatively, processor 410 can simply determine the channel quality based on the length of queue 408. Under poor channel conditions, frame backup occurs in queue 408 causing the number of frames stored in queue 408 to increase. When channel conditions are good, the number of frames stored in queue 408 decreases.

As frames are transmitted by transmitter 400, processor 410 determines the quality of the communication channel by determining the length of queue 408. If the channel quality increases, i.e., the length of queue 408 decreases below a predetermined threshold, frames are dropped at a first rate. If the channel quality decreases, i.e., the length of queue 408 increases above the predetermined threshold, frames are dropped at a second, higher rate.

The reason why frames are dropped at a higher rate when the channel quality is poor is that more frame re-transmissions occur during poor channel conditions, causing a backup of frames waiting to be transmitted at queue 408. At the receiver, during poor channel conditions, a receiver buffer first underflows due to the lack of error-free frames received, then overflows when the channel conditions improve. When the receive buffer underflows, silence frames, otherwise known as erasure frames, are provided to a voice decoder in order to minimize the disruption in voice quality to a user. If the receive buffer overflows, or becomes relatively large, latency is increased. Therefore, when the communication channel quality becomes degraded, it is desirable to drop frames at an increased rate at transmitter 400, so that neither queue 408 nor the receiver buffer grow too large, increasing latency to intolerable levels.

In a third embodiment of the present invention, latency is reduced by dropping data frames at a variable rate, depending on the communication channel latency. In this embodiment, processor 410 determines the quality of the communication channel using one of several possible techniques. The rate at which frames are dropped is inversely proportional to the communication channel quality. If the channel quality is determined by the channel error rate, the rate at which frames are dropped is directly proportional to the channel error rate.

As in other embodiments, processor 410 determines the communication channel quality, generally by measuring the length of queue 408 or by measuring the channel error rate, as discussed above. As the communication channel quality increases, that is, the channel error rate decreases, the rate at which frames are dropped decreases at a predetermined rate. As the communication channel quality decreases, that is, the channel error rate increases, the rate at which frames are dropped increases at a predetermined rate. For example, with every 1 percent point change in the channel error rate, the frame dropping rate might change by 1 percentage point.

As in the first two embodiments, when the quality of the communication channel decreases, more frame re-transmissions are necessary, resulting in either queue 408 or the receiver buffer increasing in size, causing an unacceptable amount of latency.

In a fourth embodiment of the present invention, data frames are dropped in accordance with the rate at which the data frames were encoded by voice encoder 406. In this embodiment, voice encoder 406 comprises a variable-rate vocoder, as described above. Voice encoder 406 encodes audio information into data frames at varying data rates, in the exemplary embodiment, four rates: full rate, half rate, quarter rate, and eighth rate. Processor 410 located within the transmitter determines the communication channel latency generally by determining the communication channel quality using one of several possible techniques. If processor 410 determines that the communication channel has become degraded beyond a predetermined threshold, a percentage of data frames having the lowest encoded rate generated by voice encoder 406 are dropped. In the exemplary embodiment, a percentage eighth-rate frames are dropped if the communication channel becomes degraded by more than a predetermined threshold. If processor 410 determines that the communication channel has become further degraded beyond a second predetermined threshold, a percentage of data frames having the second lowest encoding rate generated by voice encoder 406 are dropped in addition to the frames having the lowest encoding rate. In the exemplary embodiment, a percentage of both quarter-rate frames and eighth-rate frames are dropped if the communication channel becomes degraded by more than the second predetermined threshold as they are generated by voice encoder 406. Similarly, a percentage of half rate and full rate frames are dropped if the communication channel degrades further. In a related embodiment, if the communication channel becomes degraded beyond the second predetermined threshold, only a percentage of data frames having an encoding rate of the second lowest encoding rate are dropped, while data frames having an encoding rate equal to the lowest encoding rate are not dropped.

The percentage of frames dropped in any of the above scenarios is generally a predetermined, fixed number, and may be either the same as, or different, for each frame encoding rate. For example, if lowest rate frames are dropped, the predetermined percentage may be 60%. If the second-lowest and lowest frames are both dropped, the predetermined percentage may be equal to 60%, or it may be equal to a smaller percentage, for example 30%.

Figure 6:
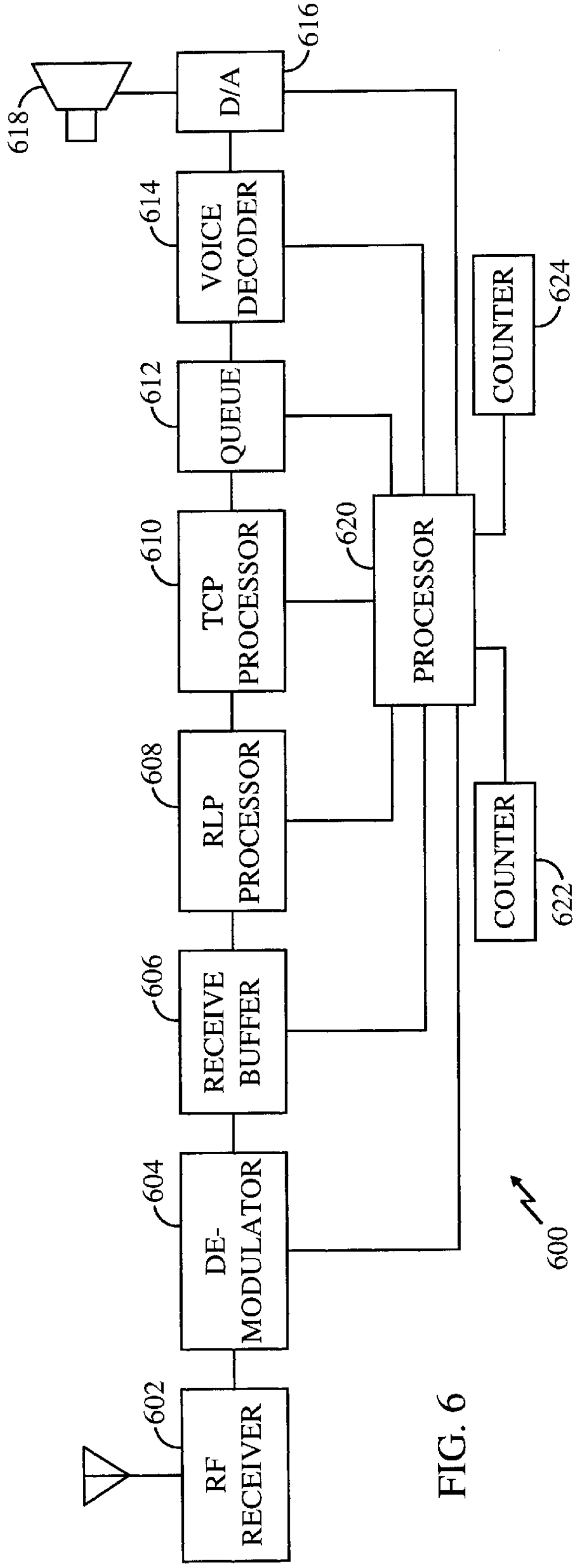
FIG. 6 illustrates a receiver used in the wireless communication system of FIG. 3 in block diagram format, configured in accordance with an exemplary embodiment of the present invention.

In a fifth embodiment of the present invention, data frames are dropped at a receiver, rather than at transmitter 400. FIG. 6 illustrates receiver 600 configured for this embodiment.

Communication signals are received by RF receiver 602 using techniques well known in the art. The communication signals are downconverted then provided to demodulator 604, where the communication signals are converted into data frames. In the exemplary embodiment, the data frames comprise RLP frames, each frame 20 milliseconds in duration.

The RLP frames are then stored in receive buffer 606 for use by RLP processor 608. RLP processor 608 uses received RLP frames stored in receive buffer 606 to re-construct data frames, in this example, TCP frames. The TCP frames generated by RLP processor 608 are provided to TCP processor 610. TCP processor 610 accepts TCP frames from RLP processor 608 and transforms the TCP frames into vocoder frames, using techniques well known in the art. Vocoder frames generated by TCP processor 610 are stored in queue 612 until they can be used by voice decoder 614. Voice decoder 614 uses vocoder frames stored in queue 612 to generate a digitized replica of the original signal transmitted from transmitter 400. Voice decoder 614 generally requires a constant stream of vocoder frames from queue 612 in order to faithfully reproduce the original audio information. The digitized signal from voice decoder 614 is provided to digital-to-analog converter D/A 616. D/A 616 converts the digitized signal from voice decoder 614 into an analog signal. The analog signal is then sent to audio output 618 where the audio information is converted into an acoustic signal suitable for a listener to hear.

The coordination of the above process is handled by processor 620. Processor 620 can be implemented in one of many ways which are well known in the art, including a discreet processor or a processor integrated into a custom ASIC. Alternatively, each of the above block elements could have an individual processor to achieve the particular functions of each block, wherein processor 620 would be generally used to coordinate the activities between the blocks.

As mentioned previously, voice decoder 614 generally requires a constant stream of vocoder frames in order to reconstruct the original audio information without distortion. To achieve a constant stream of vocoder frames, queue 612 is used. Vocoder frames generated by TCP processor 610 are generally not produced at a constant rate, due to the quality of the communication channel and the fact that a variable-rate vocoder is often used in transmitter 400, generating vocoder frames at varying encoding rates. Queue 612 allows for changes in the vocoder frame generation rate by TCP processor 610 while ensuring a constant stream of vocoder frames to voice decoder 614.

The object of queue 612 is to maintain enough vocoder frames to supply voice decoder 614 with vocoder frames during periods of low frame generation by TCP processor 610, but not too many frames due to the increased latency produced in such a situation. For example, if the size of queue 612 is 50 frames, meaning that the current number of vocoder frames stored in queue 612 is 50, voice latency will be equal to 50 times 20 milliseconds (the length of each frame in the exemplary embodiment), or 1 second, which is unacceptable for most audio communications.

In the fifth embodiment of the present invention, frames are removed from queue 612, or dropped, by processor 620 in order to reduce the number of vocoder frames stored in queue 612. By dropping vocoder frames in queue 612, the problem of latency is reduced. However, frames must be dropped such that a minimum amount of distortion is introducing into the audio information.

Processor 620 may drop frames in accordance with any of the above discussed methods of dropping frames at transmitter 400. For example, frames may be dropped at a single, fixed rate, at two or more fixed rates, or at a variable rate. In addition, if a variable-rate voice encoder 406 is used at transmitter 400, frames may be dropped on the basis of the rate at which the frames were encoded by voice encoder 406. Dropping frames generally comprises dropping further incoming frames to queue 612, rather than dropping frames already stored in queue 612.

Generally, the decision of when to drop frames is based on the communication channel latency as determined by the communication channel quality, which in turn can be derived from the size of queue 612. As the size of queue 612 increases beyond a predetermined threshold, latency increases to an undesired level. Therefore, as the size of queue 612 exceeds a predetermined threshold, processor 620 begins to drop frames from queue 612 at the single fixed rate. As the size of queue 612 decreases past the predetermined threshold, frame dropping is halted by processor 620. For example, if the size of queue 612 decreases to 2 frames, latency is no longer a problem, and processor 620 halts the process of frame dropping.

If two or more fixed rate schemes are used to drop frames, two or more predetermined thresholds are used to determine when to use each fixed dropping rate. For example, if the size of queue 612 increases greater than a first predetermined threshold, processor 620 begins dropping frames at a first predetermined rate, such as 1 percent. If the size of queue 612 continues to grow, processor 620 begins dropping frames at a second predetermined rate if the size of queue 612 increases past a second predetermined size. As the size of queue 612 decreases below the second threshold, processor 620 halts dropping frames at the second predetermined rate and begins dropping frames more slowly at the first predetermined rate. As the size of queue 612 decreases further, past the second predetermined threshold, or size, processor 620 halts frame dropping altogether so that the size of queue 612 can increase to an appropriate level.

If a variable frame dropping scheme is used, processor 620 determines the size of queue 612 on a continuous or near-continuous basis, and adjusts the rate of frame dropping accordingly. As the size of queue 612 increases, the rate at which frames are dropping increases as well. As the size of queue 612 decreases, the rate at which frames are dropped decreases. Again, if the size of queue 612 falls below a predetermined threshold, processor 620 halts the frame dropping process completely.

In another embodiment, frames may be dropped in accordance with the size of queue 612 and the rate at which frames have been encoded by voice encoder 406, if voice encoder 406 is a variable-rate vocoder. If the size of queue 612 exceeds a first predetermined threshold, or size, vocoder frames having an encoding rate at a lowest encoded rate are dropped. If the size of queue 612 exceeds a second predetermined threshold, vocoder frames having an encoding rate at a second-lowest encoding rate and the lowest encoding rate are dropped. Conceivably, frames encoded at a third-lowest encoding rate plus second lowest and lowest encoding rate frames could be dropped if the size of queue 612 surpassed a third predetermined threshold. Again, as the size of queue 612 decreases through the predetermined thresholds, processor 620 drops frames in accordance with the encoded rate as each threshold is passed.

As explained above, frame dropping can occur at receiver 600 or at transmitter 400. However, in another embodiment, frame dropping can occur at both transmitter 400 and at receiver 600. Any combination of the above embodiments can be used in such case.

In a sixth embodiment of the present invention, frame dropping is performed at the receiver, generally based on the length of queue 612 compared to a variable queue threshold. If the length of queue 612 is less than the variable queue threshold, frames are dropped at a first rate, in the exemplary embodiment, zero. In other words, when the length of queue 612 is less than the variable queue threshold, no frame dropping occurs. Frame dropping occurs at a second rate, generally higher than the first rate, if the length of queue 612 is greater than the variable queue threshold. In other related embodiments, the first rate could be equal to a non-zero value. In the sixth embodiment, the variable queue threshold is dynamically adjusted to maintain a constant level of vocoder frame integrity or voice quality.

In the exemplary embodiment, vocoder frame integrity is determined using two counters within receiver 600, although other well-known alternative techniques could be used instead. A first counter 622 increments for every vocoder frame duration, in the exemplary embodiment, every 20 milliseconds. A second counter 624 increments every time a vocoder frame is delivered from queue 612 to voice decoder 614 for decoding. Voice frame integrity is calculated by dividing count of counter 624 by the count of counter 622 at periodic intervals. The voice frame integrity is then compared to a predetermined value, for example 90%, representing an acceptable voice quality level. In the exemplary embodiment, the voice frame integrity is calculated every 25 frame intervals, or 500 milliseconds. If the voice frame integrity is less than the predetermined value, the variable queue threshold is increased by a predetermined number of frames, for example, by 1 frame. Counters 622 and 624 are then reset. The effect of increasing the variable queue threshold is that less frames are dropped, resulting in more frames being used by voice decoder 614, and thus, an increase in the voice frame integrity. Conversely, if the voice frame integrity exceeds the predetermined value, the variable queue threshold is reduced by a predetermined number of frames, for example, by 1 frame. Counters 622 and 624 are then reset. The effect of decreasing the variable queue threshold is that more frames are dropped, resulting in fewer frames being used by voice decoder 614, and thus, a decrease in the voice frame integrity.

Figure 7:
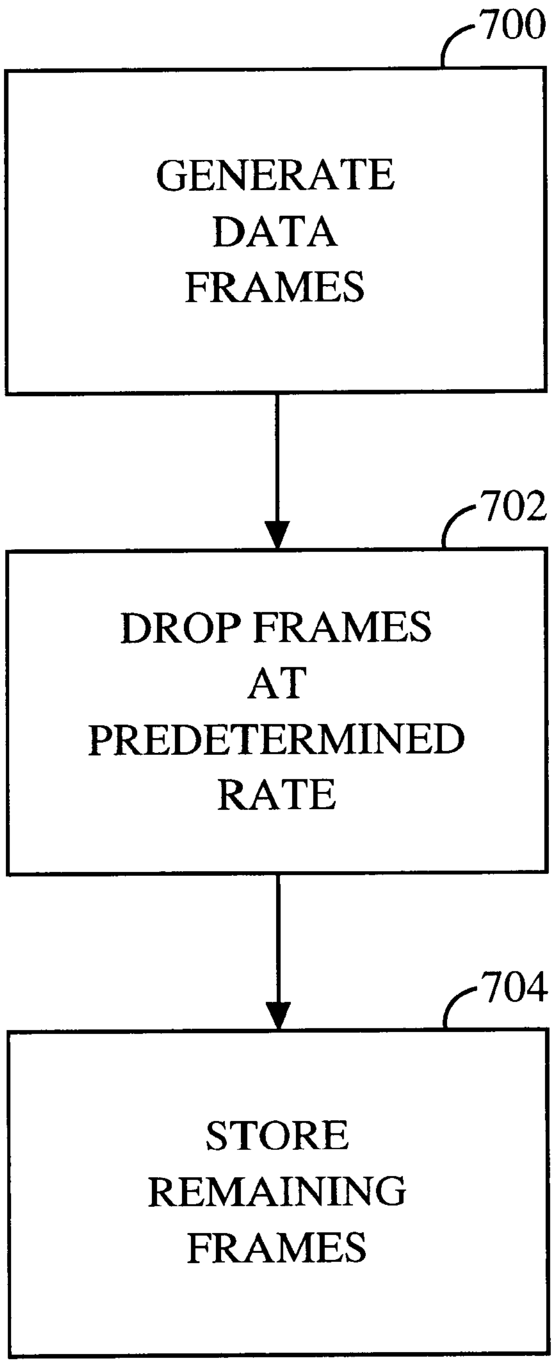
FIG. 7 is a flow diagram of the method of the first embodiment of the present invention.

FIG. 7 is a flow diagram of the method of the present invention for the first embodiment, applicable to either transmitter 400 or receiver 600.

In transmitter 400, data frames are generated from audio information in step 700. The data frames in the present invention are digitized representations of audio information, typically human speech, arranged in discreet packets or frames. Typically, the data frames are generated by voice encoder 406, or the voice encoding component of a well-known vocoder. Such data frames are typically referred to as vocoder frames. It should be understood that the use of voice encoder 406 is not mandatory for the present invention to operate. The present invention is applicable to vocoder frames or any kind of data frames generated in response to an audio signal.

In receiver 600 at step 700, data frames are generated by TCP processor 610 after being transmitted by transmitter 400 and received, downconverted, and recovered from the data encoding process used by TCP processor 410 and RLP processor 412 at transmitter 400. The data frames generated by TCP processor are replicas of the data frames generated at transmitter 400, in the exemplary embodiment, vocoder frames generated by voice encoder 406.

At step 702, data frames are dropped at a fixed, predetermined rate, in the exemplary embodiment, a rate between 1 and 10 percent. Frames are dropped regardless of the communication system latency. In transmitter 400, data frames are dropped as they are generated by voice encoder 406, prior to storage in queue 408. In receiver 600, frames are dropped as they are generated by TCP processor 610, prior to storage in queue 612.

At step 704, data frames that have not been dropped are stored in queue 408 at transmitter 400, or in queue 612 at receiver 600.

Figure 8:
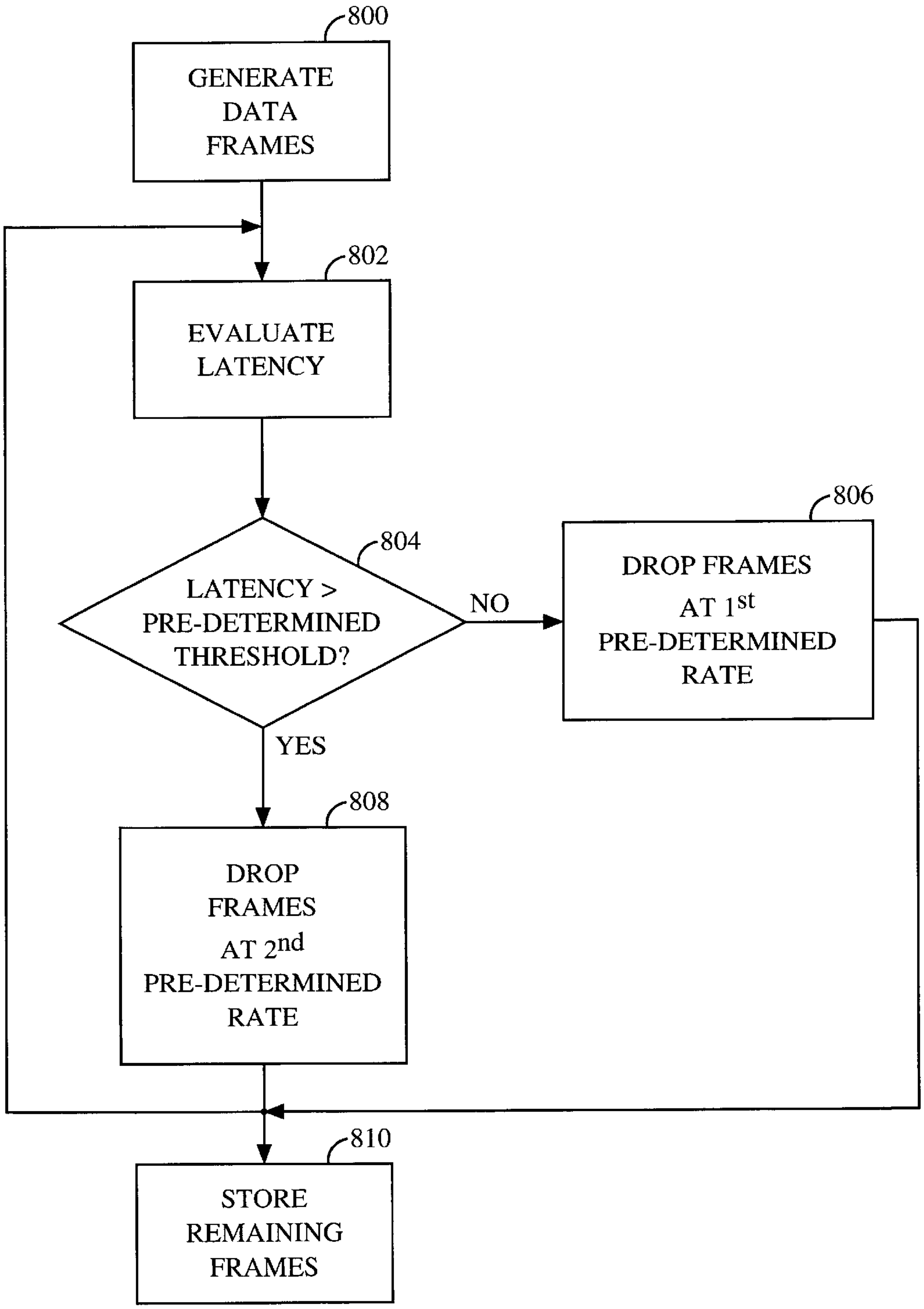
FIG. 8 is a flow diagram of the method of the second embodiment of the present invention.

FIG. 8 is a flow diagram of the method of the present invention with respect to the second embodiment, again, applicable to either transmitter 400 or receiver 600. In the second embodiment, frames are dropped at either one of two fixed, predetermined rates.

In step 800, data frames are generated at the transmitter or the receiver, as described above. In step 802, communication system latency is determined by processor 410 in transmitter 400, or by processor 620 in receiver 600. In transmitter 400, the latency of the communication system can be determined by a number of methods well known in the art. In the exemplary embodiment, the latency is determined by measuring the quality of the communication channel between transmitter 400 and receiver 600. This, in turn, is measured by counting the number of NAKs received by transmitter 400 over a given period of time. A high rate of received NAKs indicate a poor channel condition and increased latency while a low rate of received NAKs indicate a good channel condition and less latency.

Latency at receiver 600 is measured by determining the size of queue 612 at any given time. As the size of queue 612 increases, latency is increased. As the size of queue 612 decreases, latency is reduced. Similarly, the size of queue 408 can be used to determine the latency between transmitter 400 and receiver 600.

In step 804, the communication system latency is evaluated in comparison to a first predetermined threshold. In transmitter 400, if the communication channel quality is less than a first predetermined threshold, step 806 is performed in which data frames from voice encoder 406 are dropped at a first predetermined rate. In the exemplary embodiment, the first predetermined threshold is a number of NAKs received over a predetermined period of time, or the size of queue 408. Data frames generated by voice encoder 406 are then dropped at the first predetermined rate, in the exemplary embodiment, between 1 and 10 percent.

In receiver 600, the communication system latency is determined with respect to the size of queue 612. The first predetermined threshold is given in terms of the size of queue 612. If the size of queue 612 exceeds the first predetermined threshold, for example 10 frames, then step 806 is performed in which data frames from voice encoder 406 are dropped at the first predetermined rate.

Referring back to step 804, if the communication system latency is not greater than a first predetermined threshold, step 808 is performed in which frames are dropped at a second predetermined rate. The second predetermined rate is greater than the first predetermined rate. The second predetermined rate is used to quickly reduce the communication system latency.

In transmitter 400, as frames are generated by voice encoder 406, they are dropped at either the first or the second predetermined rate, and stored in queue 408, as shown in step 810. In receiver 600, as frames are generated by TCP processor 610, they are dropped at either the first or the second predetermined rate, and stored in queue 612, also shown in step 810. The process of evaluating the communication channel latency and adjusting the frame dropping rate continues on an ongoing basis, repeating the steps of 802 through 808.

Figure 9:
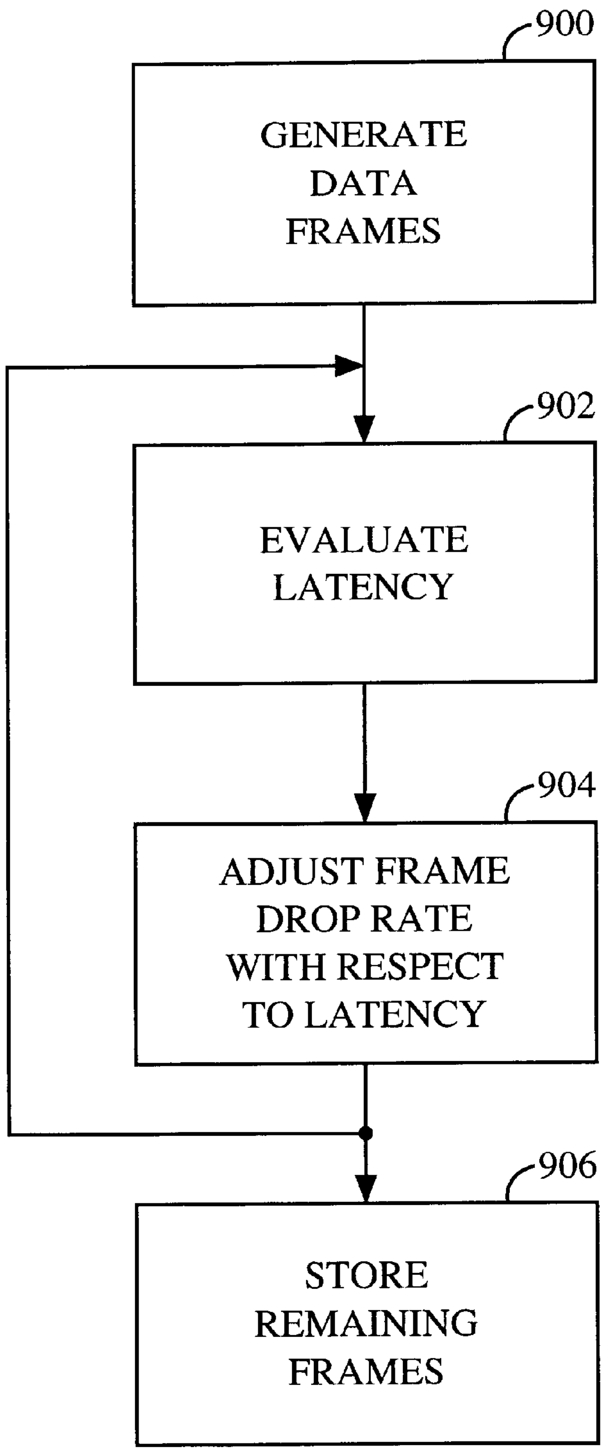
FIG. 9 is a flow diagram of the method of the third embodiment of the present invention.

FIG. 9 is a flow diagram of the method of the present invention in relation to the third embodiment. Again, the method of the third embodiment can be implemented in transmitter 400 or in receiver 600.

In step 900, data frames are generated at the transmitter or the receiver, as described above. In step 902, the communication system latency is determined by processor 410 in transmitter 400, or by processor 620 in receiver 600 on a continuous or near continuous basis. In step 904, the rate at which frames are dropped is adjusted in accordance with the latency determination of step 902. As the communication system latency increases, the rate at which frames are dropped increases, and vice-versa. The rate adjustment may be determined by using a series of latency thresholds such that as each threshold is crossed, the frame dropping rate is increased or decreased, as the case may be, by a predetermined amount. The process of evaluating the communication system latency and adjusting the frame dropping rate is repeated.

In transmitter 400, as frames are generated by voice encoder 406, they are dropped at either the first or the second predetermined rate, and stored in queue 408, as shown in step 906. In receiver 600, as frames are generated by TCP processor 610, they are dropped at either the first or the second predetermined rate, and stored in queue 612, also shown in step 906.

As described in the fourth embodiment, frames may be dropped on the basis of the rate at which they were encoded by voice encoder 406, if a variable rate vocoder is used in transmitter 400. In such case, rather than drop frames at a first or second predetermined rate, or at a variable rate, frames are dropped on the basis of their encoded rate and the level of communication system latency. For example, in FIG. 7, rather than dropping frames at a fixed, predetermined rate, a percentage of frames generated at the lowest encoding rate from voice encoder 406 are dropped prior to storage in queue 408. Similarly, at receiver 600, all frames having an encoded rate of the lowest encoding rate are dropped prior to storage in queue 612.

In FIG. 8, step 806, rather than drop frames at a first predetermined rate, frames a percentage of frames having the lowest encoded rate are dropped if the latency is not greater than the predetermined threshold. In step 808, a percentage of frames having a lowest and second-lowest encoded rate are dropped if the latency is greater than the predetermined threshold. The same principle applies to transmitter 400 or receiver 600.

Figure 10:
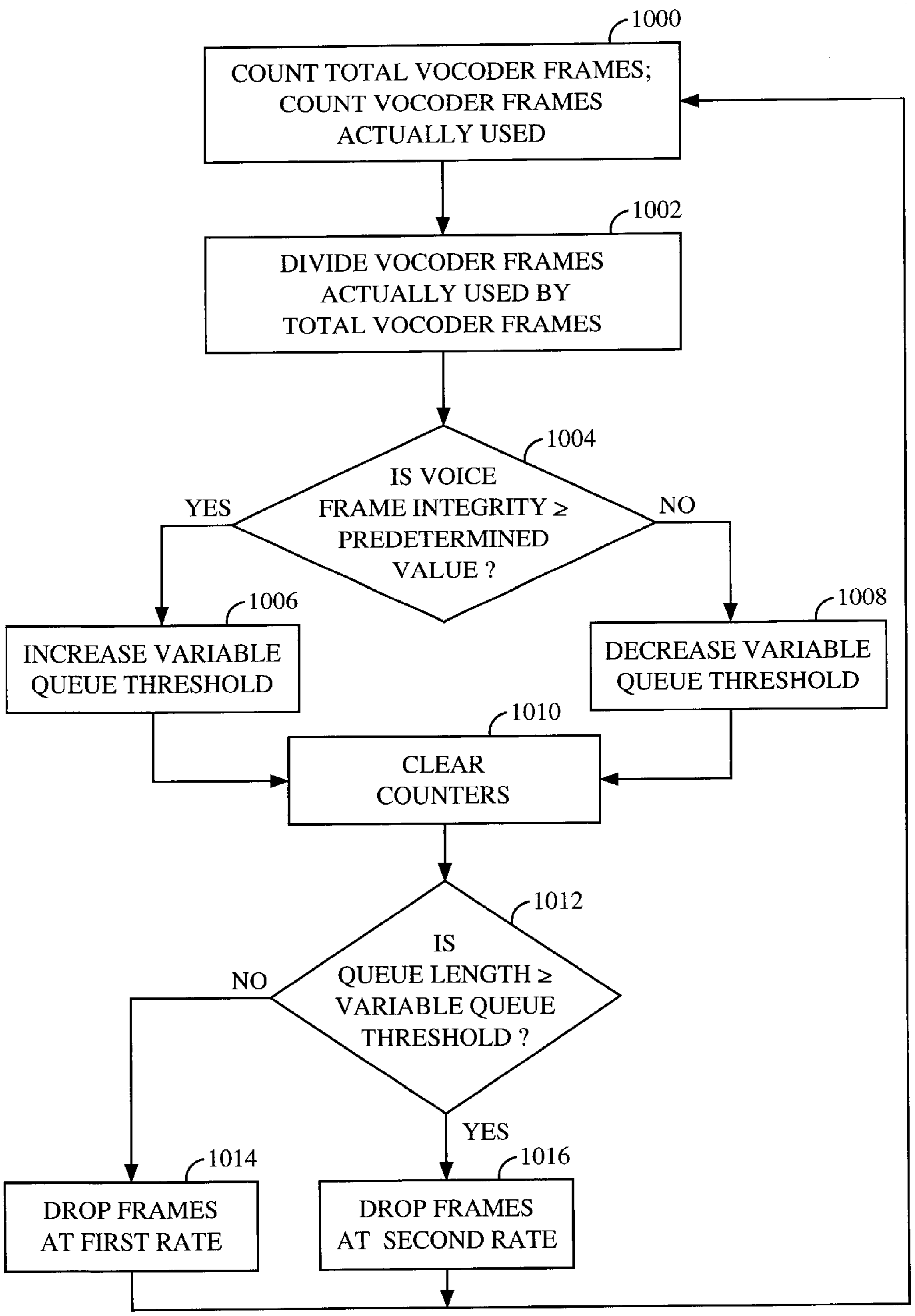
FIG. 10 is a flow diagram of the method of the sixth embodiment of the present invention.

FIG. 10 is a flow diagram of the method of the sixth embodiment of the present invention. In step 1000, counter 622 begins incrementing at a rate equal to the vocoder frame duration, in the exemplary embodiment, every 20 milliseconds. Also in step 1000, counter 624 increments every time a vocoder frame is delivered from queue 612 to voice decoder 614 for decoding.

After a predetermined time period, generally expressed as a number of vocoder frames, for example 25 frames, step 1002 is performed in which a voice frame integrity is calculated by dividing count of counter 624 by the count of counter 622. In step 1004, the voice frame integrity is compared to a predetermined value representing a minimum desired voice quality. If the voice frame integrity is less than the predetermined value, processing continues to step 1006. If the voice frame integrity is greater then or equal to the predetermined value, processing continues to step 1008.

In step 1006, a variable queue threshold is increased. In step 1008, the variable queue threshold is decreased. The variable queue threshold represents a decision point at which frames are dropped at either one of two rates, as explained below. In step 1010, counters 622 and 624 are cleared.

In step 1012, the current length of queue 612 is compared to the variable queue threshold. If the current length of queue 612, as measured by the number of frames stored in queue 612, is less than the variable queue threshold, step 1014 is performed, in which frames are dropped at a first rate, in the exemplary embodiment, zero. In other words, if the length of queue 612 is less than the variable queue length, no frame dropping occurs.

If the current length of queue 612 is greater than or equal to the variable queue threshold, step 1016 is performed, in which frames are dropped at a second rate, generally a rate greater than the first rate. The process then repeats at step 1000.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for reducing voice latency in a voice-over-data wireless communication system, comprising the steps of:

generating a plurality of data frames;

dropping one or more of said plurality of data frame to keep a plurality of remaining data frames, wherein said step of dropping further comprises:

determining a voice frame integrity;

comparing said voice frame integrity with a predetermined value, said predetermined value representing a minimum desired voice quality;

increasing a variable queue threshold if said voice frame integrity is less than said predetermined value;

decreasing said variable queue threshold if said voice frame integrity is greater than said predetermined value;

dropping times at a first rate if a length of said queue is less than said variable queue threshold;

dropping frames at a second rate if said length is greater than said variable queue; and storing said plurality of remaining data frames in a queue.

2. The method of claim 1 wherein the step of dropping one or more of said plurality of data frames comprises the step of dropping said plurality of data frames at a fixed, predetermined rate.

3. A method for reducing voice latency in a voice-over-data wireless communication system, comprising the steps of:

generating a plurality of data frames;

dropping an entire one or more of said plurality of data frames to keep a plurality of remaining data frames, wherein said step of dropping further comprises:

determining a communication channel latency; and dropping entire ones of each of said plurality of data frames having an encoded rate equal to a first encoding rate out of a number of possible encoder rates if said communication channel latency exceeds a predetermined threshold; and storing said plurality of remaining data frames in a queue.

4. The method of claim 3, further comprising the step of dropping each of said plurality of data frames having an encoded rate equal to said first encoding rate and a second encoding rate if said communication channel latency exceeds a second predetermined threshold.

5. An apparatus for reducing voice latency in a voice-over-data wireless communication system, comprising:

means for generating data flames;

a processor connected to said data frame generating means for determining a communication channel latency and for dropping an entire one or more of said data frames to keep remaining data frames; and a queue for storing said remaining data frames, wherein:

entire ones of said data frames having an encoded rate equal to a first encoding rate out of a number of possible encoder rates are dropped if said communication channel latency exceeds a predetermined threshold.

6. The apparatus of claim 5, wherein said processor is further for dropping each of said data frames having an encoded rate equal to said first encoding rate and a second encoding rate if said communication channel latency exceeds a second predetermined threshold.

7. An apparatus for reducing voice latency in a voice-over-data wireless communication system, comprising:

a receiver for receiving a wireless communication signal;

a demodulator for demodulating said wireless communication signal and for producing data frames;

means for determining a voice frame integrity;

a processor connected to said demodulator for dropping one or more of said data frames to keep remaining data frames, said processor further for comparing said voice frame integrity with a predetermined value, said predetermined value representing a minimum desired voice quality, for increasing a variable queue threshold if said voice frame integrity is less than said predetermined value, for decreasing said variable queue threshold if said voice frame integrity is greater than said predetermined value, for dropping frames at a first rate if a length of said queue is less than said variable queue threshold, and for dropping frames at a second rate if said length is greater than said variable queue threshold; and a queue for storing said remaining data frames.

* * * * *